United States Patent
Camps et al.

[11] Patent Number: 5,894,050
[45] Date of Patent: Apr. 13, 1999

[54] METHOD OF MANUFACTURING AN OPTICAL COMPONENT

[75] Inventors: Ivo G.J. Camps; Fredericus J. Touwslager, both of Eindhoven, Netherlands

[73] Assignee: U.S. Philips Corporation, New York, N.Y.

[21] Appl. No.: 08/831,212

[22] Filed: Apr. 2, 1997

[30]  Foreign Application Priority Data

Apr. 9, 1996 [EP] European Pat. Off. .............. 96200979

[51] Int. Cl.$^6$ ....................... G02B 27/28; G02F 1/1333
[52] U.S. Cl. .................. 428/429; 427/163.1; 427/164; 427/508; 427/512; 427/515; 428/428; 428/435; 428/910
[58] Field of Search ................. 427/163.1, 164, 427/508, 512, 515; 428/428, 429, 435, 910

[56]  References Cited

FOREIGN PATENT DOCUMENTS

0576072A2  12/1993  European Pat. Off. .
0643121A1  3/1995   European Pat. Off. .
WO9701779  1/1997   WIPO .

*Primary Examiner*—D. S. Nakarani
*Attorney, Agent, or Firm*—F. Brice Faller

[57]  ABSTRACT

The invention relates to a method of manufacturing an optical component. In this method, a substrate, for example of glass, is successively provided with an orientation layer and an optically anisotropic layer of a material containing monomers which are provided with at least one covalently bonded reactive group, whereafter the optically anisotropic layer is polymerized. In accordance with the present invention, the applied orientation layer also comprises covalently bonded reactive groups. As a result, a good adhesion between the optically anisotropic layer and the orientation layer of the substrate is achieved. This has a favorable effect on the optical quality of the component. For the reactive groups use is preferably made of (meth)acrylate compounds which are polymerized by exposing them to radiation. Good results are achieved if for the orientation layer use is predominantly made of polyimide with covalently bonded reactive groups. Preferably, a glass plate is used as the substrate, and a bonding layer based on an organosilane compound is provided between the substrate and the orientation layer.

7 Claims, 3 Drawing Sheets

C6M

CB6

JL 314

CB15

1

METHOD OF MANUFACTURING AN OPTICAL COMPONENT

BACKGROUND OF THE INVENTION

The invention relates to a method of manufacturing an optical component, in which method a substrate is successively provided with an orientation layer and an optically anisotropic layer of a material containing monomers which are provided with at least one covalently bonded reactive group, whereafter said optically anisotropic layer is polymerized. The method also relates to a polarization-sensitive beam splitter (PBS) and to a cholesteric filter, which are manufactured by means of this method.

A method of the type mentioned in the opening paragraph is known per se. For example, in European Patent Application EP 576 072-A1, a description is given of this method of manufacturing of a polarization-sensitive beam splitter which comprises at least a wedge-shaped element of a birefringent material, the so-called wedge-shaped PBS. The material used consists of a uniaxially oriented polymer which is formed from a polymerized, liquid-crystalline monomer composition. At least a number of the monomers of the monomer composition are provided with at least one covalently bonded reactive group. Said composition is cured by means of polymerisation between two substrates which are arranged in such a manner relative to each other that they form a wedge, the facing surfaces of said substrates being provided with an orientation layer.

Such a method is also suggested in the non-prepublished European Patent Application 95201770.5 (WO 97/01779). In said Patent Application, a description is given of the manufacture of a different type of polarization-sensitive beam splitter. This beam splitter is flat and comprises a substrate with an orientation layer on which a structured, optically anisotropic layer is provided. This layer includes areas with birefringent material and areas with isotropic material. This material is provided in two steps by means of a replica process. In this process, use is made of a pressing mould having a structured pressing surface, for example, in the form of a zigzag structure or a saw-tooth structure. First, the optically anisotropic material is provided on the orientation layer in accordance with a specific structure by means of the replica process and then polymerized. After the pressing mould has been removed, the resultant grooves are filled by means of the isotropic material (for example by spinning), whereafter also this material is polymerized. By means of this method, a so-called flat, polarization-sensitive beam splitter (flat PBS) is obtained.

Also in European Patent Application EP 643121 A1, a description is given of such a method, which is used to manufacture a switchable cholesteric filter. This filter comprises an optically active layer with liquid-crystalline material, which is sandwiched between two substrates which are each provided with an orientation layer. Said liquid-crystalline material comprises the cholesterically ordered polymerization product of a mixture of monomers of which a part contains at least one covalently bonded reactive group. By virtue of the presence of a small quantity of monomers with two covalently bonded groups, a slightly cross-linked network is formed by polymerization.

The known method has drawbacks. One of the drawbacks is that the adhesion between the polymerized, optically anisotropic layer and the substrate carrying the orientation layer is insufficient. In the manufacture of the wedge-shaped polarization-sensitive beam splitter ("wedge-shaped PBS") this disadvantage manifests itself when one of the two substrates between which the wedge-shaped optically anisotropic material is polymerized is removed. Visual inspection has revealed that when one substrate is detached, the adhesion between the wedge-shaped element and the other substrate is seriously affected. Sometimes said operation even leads to the formation of cracks in the wedge-shaped element. These effects have a negative influence on the optical quality of the wedge-shaped PBS. This is considered to be a serious disadvantage.

In the manufacture of the other type of polarization-sensitive beam splitter ("flat PBS"), a similar problem occurs. This problem manifests itself during the removal of the pressing mould, after the optically anisotropic layer has been provided and polymerized. Sometimes parts of the applied layer adhere so firmly to the surface of the mould that they are pulled loose from the substrate. Consequently, also in this case the adhesion between the optically anisotropic layer and the substrate provided with the orientation layer is insufficient.

Also in the case of the cholesteric filters manufactured by means of the known method, the adhesion between the polymerized optically anisotropic material and the substrate gives rise to problems. For example, some time after the manufacture of the filters, undesirable structures (cauliflower effect) form on the filters. Close examination of these filters has revealed that the cholesteric material becomes detached from the substrate. This can possibly be attributed to tensile stresses which develop during the polymerization of the optically active layer and the associated shrinkage.

SUMMARY OF THE INVENTION

According to the invention, the adhesion between the optically anisotropic material and the substrate provided with an orientation layer is considerably improved. Another object of the invention is to provide a method by means of which properly functioning optical components can be manufactured, such as polarization-sensitive beam splitters and cholesteric filters.

These and other objects of the invention are achieved by a method of manufacturing an optical component, in which method a substrate is successively provided with an orientation layer and an optically anisotropic layer of a material containing monomers which are provided with at least one covalently bonded reactive group, whereafter said optically anisotropic layer is polymerized, wherein the applied orientation layer also comprises covalently bonded reactive groups.

The invention is based on the insight that the adhesion between the optically anisotropic layer and the substrate is substantially improved if this layer is chemically bonded to the orientation layer provided on the substrate. In practice, this is achieved by providing a part of the molecules of the orientation layer also with covalently bonded reactive groups. During polymerization of the optically anisotropic layer, the reactive groups of the orientation layer are simultaneously polymerized. A part of these groups will react with the reactive groups of the optically anisotropic material, and conversely. This leads to the formation of chemical bonds between the optically anisotropic material and the orientation layer, resulting in an improved adhesion between the substrate and the optically anisotropic layer.

For the reactive group, various types of compounds can be used, such as epoxy compounds, vinyl-ether compounds or thiolene systems. Said compounds can be polymerized in known manner, for example by means of thermal curing.

However, the orientation layers in which the epoxy compounds and/or vinyl-ether compounds are used as the reactive groups can alternatively be polymerized by exposure to radiation in the presence of a photoinitiator. To efficiently polymerize these types of reactive groups use can be made, in particular, of photoinitiators of the type of diaryliodonium compounds, such as diphenyliodonium hexafluoroarsenide.

A preferred embodiment of the method in accordance with the invention is characterized in that for the reactive groups use is made of (meth)acrylate compounds which are polymerized by exposure to radiation. It has been found that this type of reactive groups polymerizes rapidly under the influence of radiation. Acrylate compounds are to be understood to include substituted acrylate compounds, such as chloroacrylate compounds or fluoroacrylate compounds.

To polymerize (meth)acrylate compounds use can be made of various types of actinic radiation, such as gamma radiation or irradiation with high-energy particles. Polymerization is preferably carried out by means of UV light in the presence of a suitable photoinitiator. Aromatic carbonyl compounds proved to be very suitable photoinitiators to cure (di)(meth)acrylate compounds.

Within the scope of the invention, various types of orientation layers can be used, such as orientation layers of rubbed polyethene or nylon. The most important requirement to be met by these materials is that it should be possible to provide them with reactive groups. A preferred embodiment of the method in accordance with the invention is characterized in that, for the orientation layer use is predominantly made of polyimide with covalently bonded reactive groups. The use of this type of orientation layer has the advantage that this layer can be provided with a so called "pretilt", as a result of which the optically anisotropic material can much more easily be provided with the desired orientation under certain conditions. Within this type of layers, orientation layers of polyimide with (meth)acrylate compounds as the covalently bonded reactive group are preferred. This type of orientation layer can be manufactured in a relatively simple manner.

It is noted that the customary polyimides consist of a mixture of polyamidic acid and polyimide. Such a mixture is the product of a reaction between dianhydrides and diamines. These substances react to form polyamidic acid which is subsequently converted to polyimide via a cyclization reaction and the removal of water. Dependent upon the reaction conditions, an equilibrium mixture of polyimide and polyamidic acid is formed, in which a larger proportion of the polyamidic acid is converted to polyimide by heating. The polyamidic acid may be provided with a covalently bonded reactive group. In the case of a(n) (meth)acrylate group, the carbonyl group of the polyamidic acid is esterified herewith. At a high temperature, such a bonded reactive (meth)acrylate group can become separated again from the polyamidic acid.

A further preferred embodiment of the method in accordance with the invention is characterized in that, for the substrate use is made of a glass plate, and a bonding layer based on an organosilane compound is provided between the substrate and the orientation layer. This measure results in a further improvement of the adhesion between the optically anisotropic layer and the glass substrate. In this connection, it is noted that within the scope of the invention it is alternatively possible to use substrates of a (transparent) synthetic resin, such as polymethyl methacrylate (PMMA) or polycarbonate. It has been found that the customary orientation layers of an organic material adhere well to said synthetic resin substrate. This applies, in particular, to polyimide. The adhesion between such an orientation layer and a synthetic resin substrate can be further improved by previously subjecting the substrate to an UV/ozone treatment.

Different classes of compounds can be used as the organosilane compound for the bonding layer. They have in common that they are built up of a more or less linear C-chain which is provided at one end with a silane group and which contains a reactive group at the other end, such as an amine group, an epoxy group or a vinyl ethyl ether group. The reactive group preferably is of the same type as the covalently bonded reactive group of the (precursors of the) orientation layer. The silane group is of the —Si(OR)(OR')(OR")-type, wherein R, R' and R" are selected from the group consisting of H, $CH_3$ and $C_2H_5$. The silane compound preferably comprises two or three $CH_3$ and/or $C_2H_5$ groups as R, R' and R".

A very good adhesion between the orientation layer and the glass substrate is obtained if a (meth)acrylate compound is used as the reactive group of the organosilane compound. In combination with an orientation layer based on polyimide-containing (meth)acrylate compounds as the covalently bonded reactive group and an optically anisotropic layer with (meth)acrylate compounds as the covalently bonded reactive group, an optical component is obtained in which the bond between the polymerized, optically anisotropic material and the glass substrate is very strong. In an optical component manufactured in this manner, the possibility that the optically anisotropic material may become detached from the substrate can be almost eliminated.

The method in accordance with the invention can very advantageously be used to mass-produce various types of optical components. This applies, in particular, to various types of polarization-sensitive beam splitters, as described hereinabove. It also applies to the manufacture of different types of switchable or non-switchable cholesteric filters.

Figure 1A:
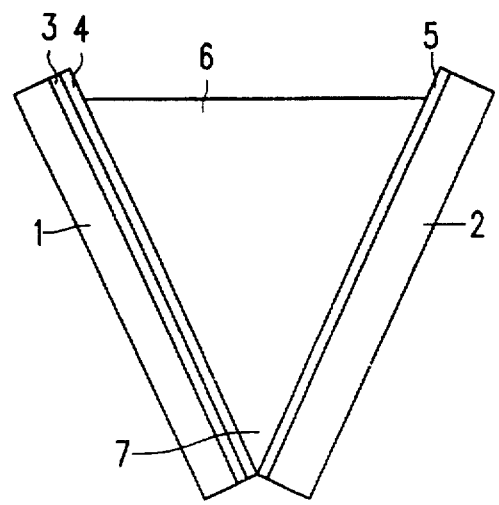
FIG. 1 schematically shows a few steps of the method in accordance with the invention, which is used to manufacture a first type of polarization-sensitive beam splitter, FIG. 2 schematically shows a few steps of the method in accordance with the invention, which is used to manufacture a second type of polarization-sensitive beam splitter, FIG. 3 schematically shows a switchable cholesteric filter which is manufactured by means of the method in accordance with the invention.

It is noted that, for clarity, the Figures are not drawn to scale.

DETAILED DESCRIPTION OF THE PREFERRED EMBODIMENTS

Exemplary embodiment 1

Two glass substrates (1) and (2) of 28 mm by 48 mm were cleaned by treating them with, in succession, acetone, extran soap, demineralized water and isopropanol, whereafter they were dried. Substrate (1) was provided with a thin bonding layer (3) of a solution containing an organosilane compound, i.e. 3-(N-styrylmethyl-2-amino-ethylamino) propyltrimethoxysilane (0.5 wt. % in ethanol), by means of spin-coating (5,000 rpm), whereafter the substrate was subjected to a heat treatment (5 minutes at 125° C.).

Subsequently, a photo-sensitive orientation layer (4) was applied to the bonding layer. This photo-sensitive orientation layer was provided by spin-coating (2,000 rpm) of an 1% solution of a polyimide (which also comprises an amount of polyamidic acid) with covalently bonded reactive methacrylate groups (ZLI 2650, Merck) in N-methylpyrrolidone. Subsequently, the substrate (1) was annealed for 60 minutes at 120° C. Owing to the relatively low annealing temperature, only a small part of the reactive methacrylate groups bonded to the polyamidic acid is separated. It is noted that the use of this type of photo-sensitive polyimide is known in the semiconductor industry, where it is used in combination with lithographic techniques.

Substrate (2) was provided with a customary polyimide layer (5) of a non-photosensitive material which, consequently, does not contain covalently bonded reactive groups. For this purpose, a solution of JIB A1 1051 (JSR) was applied by spin-coating at 5,000 rpm. Substrate (2) was not provided with a bonding layer. Subsequently, also this substrate was annealed (15 minutes at 80° C. followed by 60 minutes at 170° C.).

The glass substrates were rubbed in the longitudinal direction by means of a non-fluff cloth. Subsequently, both substrates were arranged in a mould in such a manner that they include an angle of 5° and that the long sides of the substrates were in contact with each other, the directions of rubbing of both orientation layers being parallel to each other and to the refractive edge (7) of the wedge-shaped beam splitter to be formed.

Subsequently, the wedge formed was filled with an optically anisotropic material (6) which contains monomers which are provided with at least one covalently bonded reactive group. In the present case, an acrylate was used as the reactive group. The optically anisotropic material was a liquid-crystalline material comprising a solution in dichloromethane of an 1:1 mixture of the compounds a (diacrylate C6M) and b (monoacrylate CB6) of FIG. 4. The photoinitiator added to the mixture was Irgacure 651 (Ciba Geigy) in a quantity of 0.5 wt. %.

Figure 1B:
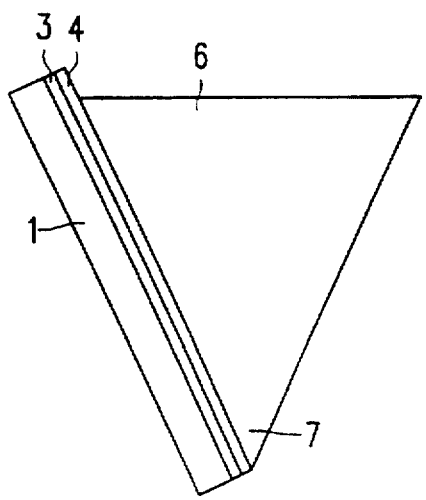
Figure 1C:
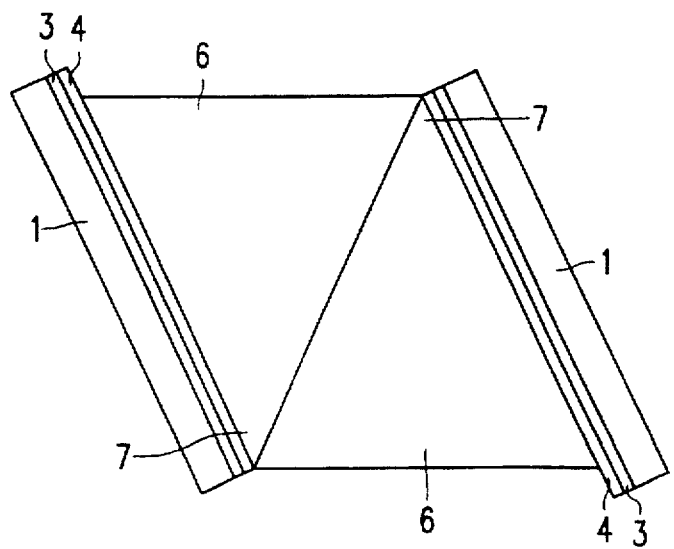

After evaporation of the solvent, the mixture was provided between the two substrates at a temperature of 105° C. (nematic phase). Subsequently, the mixture was polymerized by exposing it to UV light (360 nm; 0.14 mW/cm$^2$) for 5 minutes. In this polymerization process, also the covalently bonded reactive groups present in the bonding layer and in the orientation layer of substrate (1) are polymerized. The optical component thus produced is shown in FIG. 1-a. Subsequently, substrate (2) including orientation layer (5) are removed from the component by applying a slight pressure. The resultant optical component in the form of a wedge-shaped polarization-sensitive beam splitter is shown in FIG. 1-b.

The above-described method in accordance with the invention was also used to manufacture a second wedge-shaped component. The only difference between the two components is that the orientation (4) layers are rubbed in different directions. In the second component, the direction of rubbing made an angle of 45° C. relative to the refractive edge (7) of the wedge. Both elements were glued together (Norland 65) at the location of the surface of the wedge-shaped element which is not provided with a glass substrate. In this manner, a so-called Wollastone prism is obtained. This is shown in FIG. 1-c. Its operation is described in greater detail in the above-mentioned Patent publication EP 576072-A.

Various experiments concerning the manufacture of this type of optical component revealed that the adhesive power between the optically anisotropic material (6) and the substrate (1) was much greater than the adhesive power between the optically anisotropic material and the substrate (2). As a result, the removal of substrate (2) from the optical component was much easier than the removal of substrate (1). During application of the measure in accordance with the invention, it never happened that parts of the wedge-shaped element became detached from substrate (1) and substrate (2) at the same time. The presence of a bonding layer (3) on the basis of an organosilane compound in addition to the inventive orientation layer already present resulted in a substantial further improvement of the adhesion of the optically anisotropic layer to substrate (1).

Exemplary embodiment 2

A glass substrate (11) was pretreated by subjecting it to the following successive operations: washing with a soap solution, rinsing with water, rinsing with isopropanol and drying. Subsequently, the substrate was subjected to an UV/ozone treatment. Next, a thin bonding layer (12) was provided on the substrate (11) by means of a solution of an organosilane compound, namely 3-(N-styrylmethyl-2-amino-ethylamino)propyltrimethoxysilane (0.5 wt. % in ethanol). This solution was provided by spin-coating (2,000 rpm), whereafter the substrate was subjected to a thermal treatment (2 minutes at 120° C.).

Subsequently, an orientation layer (13) was provided on the bonding layer (12). This orientation layer was provided by spin-coating (at 2,000 rpm) a 1% solution of a polyimide with covalently bonded reactive methacrylate groups (ZLI 2650, Merck) in N-methylpyrrolidone. Next, substrate (11) with layers (12) and (13) were annealed for 60 minutes at 120° C. After cooling, the polyimide was rubbed in a specific direction by means of a non-fluff cloth.

Figure 2A:
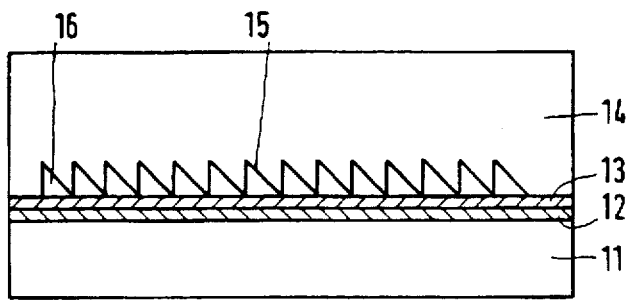
Figure 2B:
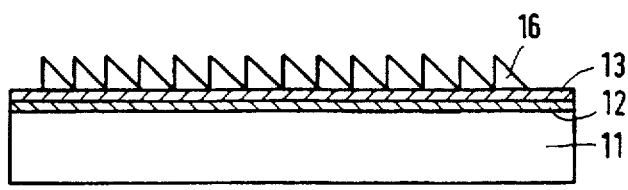
Figure 2C:
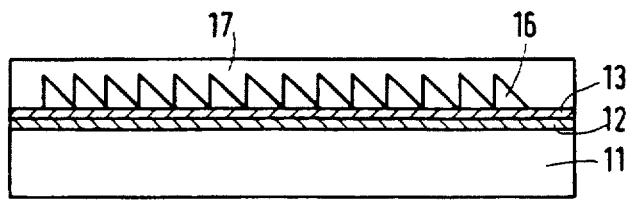
Figure 4A:
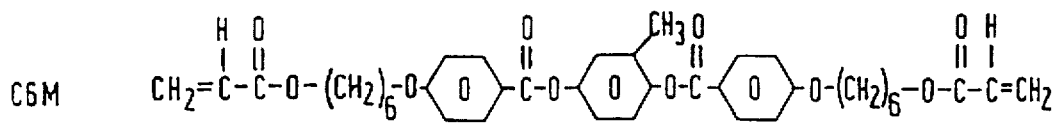
FIG. 4 shows the structural formulas of a number of chemical compounds.
Figure 4B:
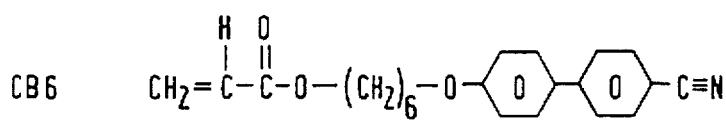
Figure 4C:
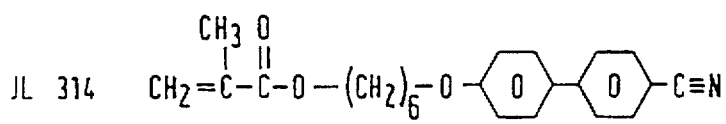
Figure 4D:
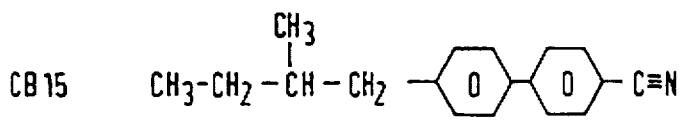

Subsequently, a pressing mould (14) of POM (polyoxymethylene) having a structured pressing surface (15), for example in the form of a zigzag structure or a saw-tooth structure, was provided so that the pressing surface was in contact with the orientation layer (13), whereafter an optically anisotropic material (16) was provided between the mould and the orientation layer at an elevated temperature (130° C.). For the optically anisotropic material, use was made of the liquid-crystalline material C6H (Merck, see FIG. 4-e), which is in the nematic phase at this temperature. The optically anisotropic material contained 0.5 wt. % of a photoinitiator (Irgacure 651). After this material had been oriented, it was polymerized at said temperature by exposing it to an UV lamp (Philips PL 10W10, 360 nm, 1 mW/cm$^2$) for 15 minutes at room temperature. This situation is shown in FIG. 2-a.

After polymerization of the optically anisotropic material (16), the mould (14) was removed. The structure of the semi-manufactured product thus obtained is shown in FIG. 2-b. Subsequently, the structured surface of the anisotropic material was provided with a thin layer (17) of an isotropic material which was subsequently polymerized for 10 minutes (Philips PL 10W10, 360 nm, 1 mW/cm$^2$). For the isotropic material use was made of a mixture of 40 wt. % bisphenol A diacrylate (Sartomer 349, see FIG. 4-f) and 60 wt. % 1,6-hexanedioldiacrylate (HDDA). A quantity of 1 wt. % Irgacure 651 was added to this mixture. The structure of the flat polarization-sensitive beam splitter thus obtained is shown in FIG. 2-c.

The results of various comparative experiments carried out during the manufacture of this type of optical component show that the adhesive power between the optically anisotropic material (16) and the substrate (11) was much greater than the adhesive power between the optically anisotropic material and the surface (15) of the pressing mould (14). As a result, the pressing mould (14) could be detached much more easily from an isotropic material (16) than the substrate (11). During application of the measure in accordance with the invention, it never happened that parts of the structured layer of optically anisotropic material (16) became detached from the substrate (11) and the pressing mould (14) at the same time. The use of a bonding layer on the basis of an organosilane, such as preferably 3-(N-styrylmethyl-2-amino-ethylamino)propyltrimethoxysilane, in addition to the inventive orientation layer already present results in a considerable further improvement of the adhesion of the optically anisotropic layer (16) to the substrate (11).

Exemplary embodiment 3

Figure 3:
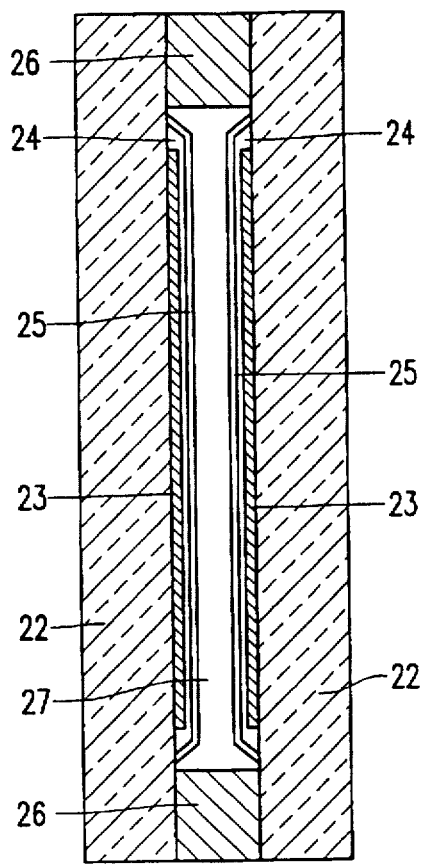
Figure 4E:
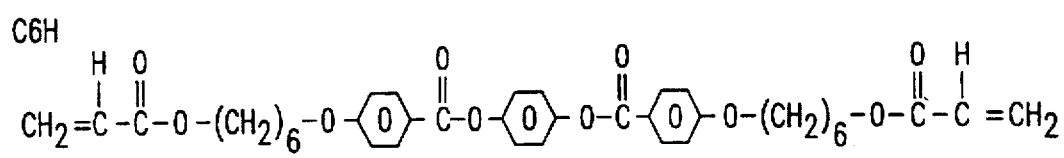
Figure 4F:
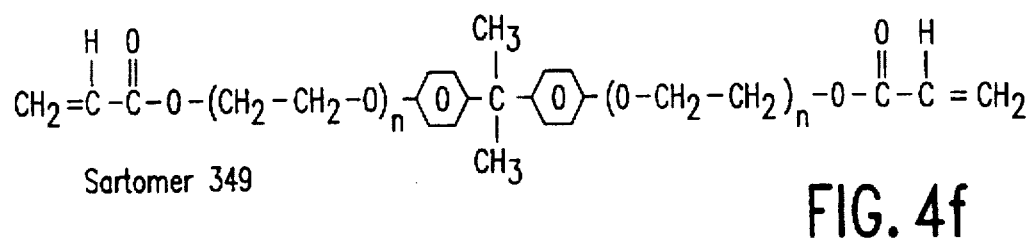

In order to manufacture a polished glass substrate shown in FIG. 3, two polished glass substrates (22) of 10 cm by 10 cm were cleaned by successively treating them with a 5% solution of extran soap, demineralized water and isopropanol, whereafter they were dried. Both substrates were first provided with a layer (23) of conductive ITO (indium tin oxide). Subsequently, both substrates were provided with a thin bonding layer (24) of an organosilane solution, i.e. 3-(N-styrylmethyl-2-amino-ethylamino) propyltrimethoxysilane (0.5 wt. % in ethanol). The bonding layer (24) was provided by spin-coating (5,000 rpm), whereafter both substrates were subjected to a thermal treatment (5 minutes at 125°).

Subsequently, the bonding layer (24) of both substrates was provided with an orientation layer (25). This layer was provided by spin-coating (2,000 rpm) a 1% solution of a polyimide with covalently bonded reactive methacrylate groups (ZLI 2650, Merck) in 1-methylpyrrolidone. Subsequently, both substrates (22) were annealed for 60 minutes at 120° C. After cooling, the orientation layers (25) were rubbed with a non-fluff, velvet cloth.

The orientation layer of one of the two substrates was provided with spacers (not shown) in the form of balls having a diameter of 4.2 microns, which were applied by spin-coating. The other substrate was provided at the side faces with an UV-sensitive glued seam (26) which served as a seal, whereafter both substrates were stacked in such a manner that the orientation layers faced each other. Subsequently, the cell thus formed was filled with an optically anisotropic material (27) in the form of a liquid-crystalline material having a cholesteric order, which contained monomers having covalently bonded reactive groups as well as a photoinitiator. In the present case, a mixture was used which consisted of 1 wt. % of the diacrylate C6M (FIG. 4-a), 19 wt. % of the monoacrylate JL 314 (FIG. 4-c), 39.5 wt. % of the non-reactive chiral compound CB15 (FIG. 4-d) as well as 40.5 wt. % of the non-reactive achiral BL 006. BL 006 (Merck) consists of a mixture of fluorine-substituted and/or chlorine-substituted cyanobivinyl compounds and cyanotervinyl compounds. A quantity of 1 wt. % of the photoinitiator Irgacure 651 was added to this mixture.

Finally, the cholesteric cell was exposed to light. As a result thereof, the cholesteric material was polymerized. Polymerization took place by exposing the cell to UV light (360 nm; 1 mW/cm²) for 5 minutes. In this polymerization process, also the covalently bonded reactive groups present in the bonding layer and in the orientation layer of substrate (1) are polymerized.

The results of various comparative experiments carried out during the manufacture of the cholesteric filter in accordance with the invention, as shown in FIG. 3, revealed that the adhesion of the optically anisotropic material to the substrates was much stronger than the adhesive powers of the known filters. This is demonstrated by the fact that the filters in accordance with the invention do not exhibit "cauliflower effects", not even after various accelerated life tests. The use of a bonding layer on the basis of an organosilane in addition to the inventive orientation layer already present resulted in a considerable further improvement of the adhesion of the cholesteric layer (27) to both substrates.

It is noted that the description of the inventive method relates to a switchable cholesteric filter. However, the effect of the inventive method is also obtained in the case of non-switchable cholesteric filters.

It has been found that the present invention enables optical components to be manufactured in which an optically anisotropic material is firmly bonded to a substrate. By virtue thereof, undesirable detachment of the material from the substrate or from the orientation layer on the substrate is precluded. This has a favorable effect on the optical quality of the components.

We claim:

1. A method of manufacturing an optical component, said method comprising providing a substrate with an orientation layer comprising covalently bonded reactive groups, providing an optically anisotropic material on said orientation layer, said optically anisotropic material comprising monomers having at least one covalently bonded reactive group, and polymerizing said orientation layer and said optically anisotropic material so that chemical bonds are formed between said reactive groups in said optically anisotropic material and said reactive groups in said orientation layer.

2. A method as in claim 1 wherein said reactive groups consist essentially of (meth)acrylate compounds, and wherein said polymerizing is done by exposing said orientation layer and said optically anisotropic material to radiation.

3. A method as in claim 1 wherein said orientation layer consists essentially of polyimide with covalently bonded reactive groups.

4. A method as in claim 1 wherein said substrate is a glass plate, said method further comprising providing a bonding layer between said glass plate and said orientation layer, said bonding layer comprising an organosilane compound.

5. A method as in claim 4 wherein the organosilane compound comprises a methacrylic group.

6. A polarization sensitive beam splitter manufactured by the method of claim 1.

7. A cholesteric filter manufactured by the method of claim 1.

* * * * *